United States Patent
Fardi

(10) Patent No.: US 8,411,145 B2
(45) Date of Patent: Apr. 2, 2013

(54) VEHICLE PERIPHERY MONITORING DEVICE, VEHICLE PERIPHERY MONITORING PROGRAM AND VEHICLE PERIPHERY MONITORING METHOD

(75) Inventor: Basel Fardi, Chemnitz (DE)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 12/450,588

(22) PCT Filed: Apr. 27, 2007

(86) PCT No.: PCT/JP2007/059224
§ 371 (c)(1),
(2), (4) Date: Oct. 1, 2009

(87) PCT Pub. No.: WO2008/139530
PCT Pub. Date: Nov. 20, 2008

(65) Prior Publication Data
US 2010/0103262 A1    Apr. 29, 2010

(51) Int. Cl.
*H04N 7/18* (2006.01)
*H04N 5/225* (2006.01)

(52) U.S. Cl. ..................... 348/148; 348/169

(58) Field of Classification Search .............. 348/148, 348/169
See application file for complete search history.

(56) References Cited

U.S. PATENT DOCUMENTS

| | | | | |
|---|---|---|---|---|
| 5,530,420 A | * | 6/1996 | Tsuchiya et al. | 340/435 |
| 5,633,705 A | | 5/1997 | Asayama | |
| 6,175,644 B1 | * | 1/2001 | Scola et al. | 382/141 |

(Continued)

FOREIGN PATENT DOCUMENTS

| EP | 1 580 075 A2 | 9/2005 |
|---|---|---|
| EP | 1 666 919 A2 | 6/2006 |

(Continued)

OTHER PUBLICATIONS

Fardi, Basel et al., "Shape and Motion-based Pedestrian Detection in Infrared Images: A Multi Sensor Approach", Intelligent Vehicles Symposium, 2005. Proceedings. IEEE Las Vegas, NV USA, Jun. 6-8, 2005, Piscataway, NJ, USA, IEEE, Piscataway, NJ, USA LNKD-DOI:10.1109/IVS.2005.1505071, Jun. 6, 2005, pp. 18-23, XP010833936; ISBN: 978-0-7803-8961-8.

(Continued)

*Primary Examiner* — Patrice Winder
*Assistant Examiner* — Ebrahim Golabbakhsh
(74) *Attorney, Agent, or Firm* — Carrier Blackman & Associates, P.C.; Joseph P. Carrier; William D. Blackman

(57) ABSTRACT

A vehicle periphery monitoring device includes an image processing target area setting portion (21) configured to set an image processing target area in the captured image based on a distance detected by a radar between object and a vehicle; a directivity extracting portion (22) configured to perform a differential filtering on each of pixels in the image processing target area in a predefined direction; an image processing target area correcting portion (23) configured to extract a feature region having a feature amount of a pedestrian's head and to correct a range of the image processing target area based on a position of the feature region; a contour extracting portion (24) configured to extract a contour of the image portion included in the corrected image processing target area; and an object type discriminating portion (25) configured to discriminate a type of the monitoring object based on the extracted contour.

8 Claims, 10 Drawing Sheets

U.S. PATENT DOCUMENTS

| | | | |
|---|---|---|---|
| 7,176,830 | B2 | 2/2007 | Horibe |
| 7,358,889 | B2 | 4/2008 | Abe et al. |
| 7,522,747 | B2 | 4/2009 | Horibe |
| 2002/0080425 | A1 | 6/2002 | Itokawa |
| 2005/0213794 | A1* | 9/2005 | Horibe ................. 382/104 |
| 2006/0115115 | A1 | 6/2006 | Nagaoka et al. |
| 2008/0144885 | A1* | 6/2008 | Zucherman et al. ........ 382/103 |

FOREIGN PATENT DOCUMENTS

| | | |
|---|---|---|
| GB | 2 289 816 A | 11/1995 |
| JP | 06-139355 | 5/1994 |
| JP | 7-125567 | 5/1995 |
| JP | 08-161498 | 6/1996 |
| JP | 10-295679 | 11/1998 |
| JP | 2001-006096 | 1/2001 |
| JP | 2001-266158 | 9/2001 |
| JP | 2002-230548 A | 8/2002 |
| JP | 2003-070742 | 3/2003 |
| JP | 2003-302470 | 10/2003 |
| JP | 3515926 | 4/2004 |
| JP | 2005-115618 | 4/2005 |
| JP | 2005-149145 | 6/2005 |
| JP | 2005-316701 | 11/2005 |
| JP | 2006-151125 | 6/2006 |
| JP | 2006-185433 | 7/2006 |
| JP | 2006-236255 | 9/2006 |
| JP | 2007-020064 | 1/2007 |
| WO | 2005/024464 A1 | 3/2005 |

OTHER PUBLICATIONS

Xu, C et al., "Snakes, Shapes and Gradient Vector Flow", IEEE Transactions on Image Processing, IEEE Service Center, Piscataway, NJ, US LNKD-DOI:10.1109/83.661186, vol. 7, No. 3, Mar. 1, 1998, pp. 359-369, XP002244153, ISSN:1057-7149.

Jierong Cheng et al., "Directional Gradient Vector Flow for Snakes", Signal Processing and Information Technology, 2004. Proceedings of the Fourth IEEE International Symposium on Rome, Italy Dec. 18-21, 2004, Piscataway, NJ, USA, IEEE LNKD- DOI:10.1109/ISSPIT.2004.1433748, Dec. 18, 2004, pp. 318-321, XP010800518 ISBN:978-0-78038689-1 *figure 4*.

Liang Zhu et al., "A Depth-First Search Algorithm Automatic Initialization Splitting of Snakes", Bioengineering Conference, 2007. NEBC '07. IEEE 33rd Annual Northeast, IEEE, Piscataway, NJ, USA LNKD- DOI:10.1109/NEBC.2007.4413309, Mar. 1, 2007, pp. 122-123,XP031198120, ISBN: 978-1-4244-1032-3.

Chenyang Xu et al., "Gradient Vector Flow: A New External Force for Snakes", Computer Vision and Pattern Recognition, 1997. Proceedings., 1997 IEEE Computer Society Conference on San Juan, Puerto Rico Jun. 17-19, 1997, Los Alamitos, CA, USA, IEEE Comput. Soc, US LNKD- DOI:10.1109/CVPR.1997.609299, Jun. 17, 1997, pp. 66-71, XP010237503 ISBN: 978-0-8186-7822-6.

Kass et al., Snakes: Active Contour Models, International Journal of Computer Vision, 321-331 (1998), © 1987 Kluwer Academic Publishers, Boston, Manufactured in the Netherlands.

Nixon M; Aguado A. "Feature Extraction and Image Processing", Jan. 1, 2002, pp. 217-245, XP007919376.

Tinku Acharya and Ajoy K. Ray, "Image Processing:Principles and Applications [Image Processing:Principles and Applications", Wiley-Interscience, Sep. 8, 2005, pp. 194-207, XP007919377.

Bernd Jahne, Horst Haussecker, Peter Geissler, "Handbook of Computer Vision and Applications, vol. 2: Signal Processing and Pattern Recognition", Academic Press 1999, pp. 209-238, 455, 481-484, XP007919467.

Jasjit S. Suri, S. Kamaledin Setarehdan, Sameer Singh, "Advanced Algorithmic Approaches to Medical Image Segmentation: State-of-the-Art Applications in Cardiology, Neurology, Mammography and Pathology", Springer, 2002, pp. 416-439, XP007919378.

Broggi, A, et al., "Shape-based Pedestrian Detection", Intelligent Vehicles Symposium, 2000. IV 2000. Proceedings of the IEEE Dearborn, MI, USA Oct. 3-5, 2000 Piscataway, NJ, USA, IEEE, US, Oct. 3, 2000, pp. 215-220, XP010528939, ISBN 978-0-7803-6363-2.

"Ellipse—Wikipedia", Dec. 8, 2011, XP55014322, Retrieved from the Internet: URL:http://en.wikipedia.org/w/index.php?, title=Special:Book&bookcmd=download&collection_ id=33109508e9aa1b38&writer=rl&r, [retrieved on Dec. 8, 2011].

"Ellipse—Math Open Reference", Math Open Reference, Dec. 8, 2011, XP55014324, [retrieved on Dec. 8, 2011].

Roy E. Davis: "Machine vision: theory, algorithms, practicalities", Jan. 1, 2005, Elsevier, Amsterdam, XP55014376, pp. i-xxi, 338-360, 518-593.

Huang K et al.: "Vs-star: A visual interpretation system for visual surveillance", Pattern Recognition Letters, Elsevier, Amsterdam,NL, vol. 31, No. 14, Oct. 15, 2010, pp. 2265-2285, SP027252295, ISSN:0167-8655, [retrieved on Jun. 1, 2010].

Pai C-J et al.: "Pedestrian detection and tracking at crossroads", Pattern Recognition, Elsevier, GB, vol. No. 5, May 1, 2004, pp. 1025-1034, XP004496840, ISSN: 0031-3203, DOI: 10.1016/J.PATCOG.2003.10.005.

Pataridis et al.: "Bounding ellipse fitting to head images for accurate active contour", International Congress Series, Excerpta Medica, Amsterdam, NL, vol. 1281, May 1, 2005. p. 1274, XP005081863, ISSN:0531-5131, DOI: 10.1016/J.ICS.2005.03.308.

* cited by examiner

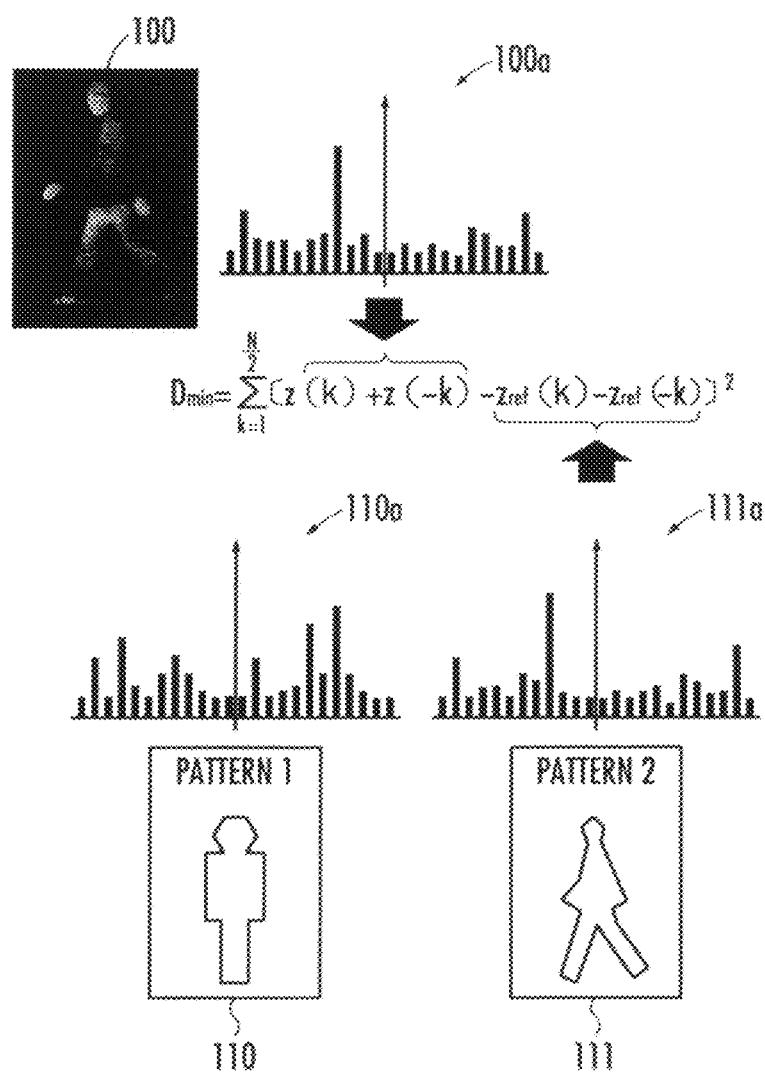

VEHICLE PERIPHERY MONITORING DEVICE, VEHICLE PERIPHERY MONITORING PROGRAM AND VEHICLE PERIPHERY MONITORING METHOD

BACKGROUND OF THE INVENTION

1. Field of the Invention

The present invention relates to a vehicle periphery motoring device which monitors a vehicle periphery by detecting a monitoring object located in the vehicle periphery according to a captured image by an imaging unit mounted in the vehicle, a vehicle periphery motoring program and a vehicle periphery motoring method.

2. Description of the Related Art

Conventionally, there has been known a vehicle periphery monitoring device (for example, refer to Japanese Patent No. 3515926) which detects a monitoring object located in a vehicle periphery according to a captured image about the vehicle periphery taken by a camera mounted in the vehicle. Moreover, as an extracting approach of extracting a contour of an image portion in the captured image, Snakes algorithm, for example, is known (for example, refer to M. Kass, A. Witkin, D. Terzopoulos "Snakes: Active Contour Models", International Journal of Computer Vision, Vol. 2 No. 3, 1988).

Therefore, it has been considered to extract a contour of an image portion contained in a captured image by a camera mounted in a vehicle and discriminate a type of a monitoring object in a real space corresponding to the image portion according to the features of the contour, thereby to improve discrimination accuracy on discriminating the type of the monitoring object.

However, since the throughput of a convergence computation for extracting the contour is enormous, it is necessary to use a computer of high performance. Thus, for a vehicle mounted with a computer of ordinary performance, it will take longer time to perform the contour extraction processing. Consequently, it is difficult to adopt the object-type discrimination based on the contour extraction in a vehicle periphery monitoring device in which real time processing is required.

SUMMARY OF THE INVENTION

The present invention has been accomplished in view of the aforementioned problems, and it is therefore an object of the present invention to provide a vehicle periphery motoring, a vehicle periphery motoring program and a vehicle periphery motoring method capable of reducing a throughput in extracting a contour of an image portion of a monitoring object contained in a captured image to shorten a time required for extracting the contour.

To attain an object of the present invention described above, the vehicle periphery monitoring device of the present invention is provided with an imaging unit mounted in a vehicle to image a periphery of the vehicle and is configured to monitor the periphery of the vehicle on the basis of a captured image by the imaging unit.

The vehicle periphery monitoring device of the present invention includes an object detecting portion configured to detect an object located in an imaging area imaged by the imaging unit; an image processing target area setting portion configured to set an image processing target area which may include an image portion of a monitoring object in the captured image on the basis of a detection result from the object detecting portion; a contour extracting portion configured to extract a contour of the image portion included in the image processing target area; and an object type discriminating portion configured to discriminate a type of the monitoring object in a real space corresponding to the image portion from which the contour has been extracted by the contour extracting portion on the basis of the extracted contour.

According to the present invention, the image processing target area which may include the image portion of the monitoring object in the captured image is set by the image processing target area setting portion on the basis of the detection result from the object detecting portion. Then, the contour extracting portion extracts the contour of the image portion included in the image processing target area. According thereto, by limiting the image portion used for extracting the contour in the image processing target area, it is able to reduce the throughput of extracting the contour and shorten the time for extracting the contour in comparison with the case where the contour is extracted with respect to the whole captured image without any limitations.

The object type discriminating portion discriminates whether or not the type of the monitoring object in the real space corresponding to the image portion from which the contour has been extracted is a predefined type by comparing a frequency component of the contour extracted by the contour extracting portion with a comparison pattern of frequency components set according to the monitoring object of the predefined type.

According to the present invention, whether the type of the monitoring object in the real space corresponding to the image portion where the contour has been extracted is a predefined type can be discriminated by using the frequency component of the contour as a characteristic index value for the predefined type of the monitoring object.

The present invention further includes a directivity extracting portion configured to perform a directivity extraction processing which performs a differential filtering on each of pixels in the image processing target area in a predefined direction, allocates a predefined first luminance to a pixel whose directivity has been recognized by the differential filtering and allocates a second luminance having a difference of not smaller than a predefined level compared with the first luminance to a pixel whose directivity is not recognized, wherein the contour extracting portion extracts the contour of the image portion in the image processing target area where the directivity extraction processing has been performed.

According to the present invention, by performing the directivity extraction processing with respect to the image processing target area, the luminance difference between the axils with directivity and the axils without directivity can be further differentiated, as a result thereof, it is possible to obtain the image portion with the contour thereof emphasized from the image processing target area. Thereafter, the contour of the image portion in the image processing target area on which the directivity extraction processing has been performed is extracted by the contour extracting portion. Consequently, the extraction accuracy for extracting the contour can be improved.

The contour extracting portion extracts the contour of the image portion by setting an initial eclipse circling the image portion in the image processing target area where the directivity extraction processing has been performed and scaling down the circumference of the initial ellipse inward to a position of a pixel which has a luminance equal to a threshold set between the first luminance and the second luminance.

According to the present invention, the contour of the image portion can be extracted by scaling down the circumference of the initial ellipse inward close to the contour of the image portion whose contour has been emphasized by the directivity extraction processing.

The contour extracting portion extracts the contour of the image portion by setting an initial eclipse circling the image portion in the image processing target area and performing a contour convergence processing on the initial ellipse according to Snakes algorithm, the contour convergence processing is performed according to the Snakes algorithm by using a computation expression in which a multiplication term of an internal energy of Snakes energy where the Snakes energy and a contour positional variation and an external energy variation and an internal energy variation are presumed to be of zero at the time when a contour of a Snakes model of a discrete system is converged is multiplied to a multiplication term of the external energy.

According to the present invention, the contour extracting portion performs the contour convergence processing by using the computation expression in which a multiplication term of an internal energy of Snakes energy where the Snakes energy and a contour positional variation and an external energy variation and an internal energy variation are presumed to be of zero at the time when a contour of a Snakes model of a discrete system is converged is multiplied to a multiplication term of the external energy. According thereto, it is able to reduce the throughput of the contour convergence processing by the Snakes algorithm and therefore shorten the time for extracting the contour, which will be described again hereinafter.

The contour extracting portion sets an initial eclipse circling the image portion in the image processing target area where the directivity extraction processing has been performed, and extracts a contour of the image portion by scaling down the circumference of the initial ellipse inward to a position of a pixel which has a luminance equal to a threshold set between the first luminance and the second luminance; the extracted contour is further converged by a contour convergence processing performed thereon according to Snakes algorithm; and the contour convergence processing is performed according to the Snakes algorithm by using a computation expression in which a multiplication term of an internal energy of Snakes energy where the Snakes energy and a contour positional variation and an external energy variation and an internal energy variation are presumed to be of zero at the time when a contour of a Snakes model of a discrete system is converged is multiplied to a multiplication term of the external energy.

According to the present invention, the initial ellipse circling the image portion in the image processing target area on which the directivity extraction processing has been performed is set and the contour is extracted by the contour extracting portion, and the extracted contour is further converged by a contour convergence processing performed thereon according to Snakes algorithm, it is possible to shorten the time needed by the contour convergence processing, and therefore, the extraction accuracy for extracting the contour can be improved.

The contour extracting portion uses the following mathematical expressions (6) and (7) as the computation expression:

[Mathematical expression 6]

$$x^t = (I - \gamma A)\{x^{t-1} - \gamma f_x(x^{t-1}, y^{t-1})\} \quad (6)$$

[Mathematical expression 7]

$$y^t = (I - \gamma A)\{y^{t-1} - \gamma f_y(x^{t-1}, y^{t-1})\} \quad (7)$$

Herein,
($x^t$, $y^t$): coordinate of a contour dot at timing t;
($x^{t-1}$, $y^{t-1}$): a model expression of the contour at timing t−1;
I: a unit matrix;
A: a transform matrix of internal energy:
γ: an iteration step (moving amount of the contour per step when converging it inward);
$f_x$: a computation expression of x components of the external energy; and
$f_y$: a computation expression of y components of the external energy.

According to the present invention, it is possible for the contour extracting portion to reduce the throughput needed to perform the contour convergence processing according to Snake algorithm and shorten the extraction time for extracting the contour by using the mathematical expressions (6) and (7).

The iteration step γ in the mathematical expressions (6) and (7) is configured to satisfy the following conditions defined by the mathematical expression (10) for the following mathematical expression (9) which is a Snakes expression where the discrete model of the contour is defined according to the following mathematical expression (8):

[Mathematical expression 8]

$$K_i = (x_i, y_i)^T = (x(ih), (ih))^T, i \in \{0, 1, \ldots, n-1\} \quad (8)$$

Herein, Ki: discrete model of the contour

[Mathematical expression 9]

$$E = \sum_{i=0}^{n-1} (E_{int}(K_i) + E_{ext}(K_i)) \quad (9)$$

$$= -\frac{\alpha}{h^2}(K_{i-1} - 2K_i + K_{i+1}) + \frac{\beta}{h^4}\begin{pmatrix} K_{i-2} - 4K_{i-1} + \\ 6K_i - 4K_{i+1} + K_{i+2} \end{pmatrix} +$$

$$\left(\frac{\partial E_{ext}(K_i)}{\partial x_i}, \frac{\partial E_{ext}(K_i)}{\partial y_i}\right)^T$$

Herein,
E: Snakes expression;
$E_{int}(K_i)$: Internal energy:
$E_{ext}(K_i)$: External energy:
α, β: computation coefficients.

[Mathematical expression 10]

$$\frac{\alpha}{h^2} + 4\frac{\beta}{h^4} \leq \frac{1}{2\gamma} \quad (10)$$

According to the present invention, which will be described hereinafter, by configuring the iteration step γ to satisfy the conditions defined by the mathematical expression (10), it is possible for the contour extracting portion to perform stably the contour convergence processing according to the mathematical expressions (6) and (7).

The present invention further includes a radar, which is mounted in the vehicle, configured to detect a distance between the vehicle and the object located in the imaging area imaged by the imaging unit, wherein the object detecting portion detects the object located in the imaging area according to the distance detected by the radar.

According to the present invention, the object detecting portion can detect the object located in a range of a predefined distance from the vehicle according to the distance detected by the radar. Then, the area containing the image portion of the object can be set by the image processing target area setting portion as the image processing target area.

A vehicle periphery monitoring program of the present invention causes a computer provided with an accessing portion configured to access a captured image by an imaging unit which is mounted in a vehicle to image a periphery of the vehicle to monitor the periphery of the vehicle on the basis of the captured image by the imaging unit.

The program functions the computer as an object detecting portion configured to detect an object located in an imaging area imaged by the imaging unit; an image processing target area setting portion configured to set an image processing target area which may include an image portion of a monitoring object in the captured image on the basis of a detection result from the object detecting portion; a contour extracting portion configured to extract a contour of the image portion included in the image processing target area; and an object type discriminating portion configured to discriminate a type of the monitoring object in a real space corresponding to the image portion from which the contour has been extracted by the contour extracting portion on the basis of the extracted contour.

By executing the vehicle periphery monitoring program of the present invention in the computer, the object detecting portion, the image processing target area setting portion, the contour extracting portion and the object type discriminating portion in the vehicle periphery monitoring device of the present invention as described above can be constituted.

A vehicle periphery monitoring method of the present invention monitors a periphery of a vehicle according to a computer provided with an accessing portion configured to access a captured image by an imaging unit which is mounted in the vehicle to image the periphery of the vehicle to monitor the periphery of the vehicle on the basis of the captured image by the imaging unit.

The vehicle periphery monitoring method of the present invention includes an object detecting step in which the computer detects an object located in an imaging area imaged by the imaging unit; an image processing target area setting step in which the computer sets an image processing target area which may include an image portion of a monitoring object in the captured image on the basis of a detection result from the object detecting step; a contour extracting step in which the computer extracts a contour of the image portion included in the image processing target area; and an object type discriminating step in which the computer discriminates a type of the monitoring object in a real space corresponding to the image portion from which the contour has been extracted by the contour extracting step on the basis of the extracted contour.

According to the present invention, in the image processing target area setting step, the computer sets the image processing target area which may include the image portion of the monitoring object in the captured image on the basis of the detection result from the object detecting step. In the contour extracting step, the computer extracts the contour of the image portion included in the image processing target area. According thereto, by limiting the image portion used for extracting the contour in the image processing target area, it is able to reduce the throughput of extracting the contour and shorten the time for extracting the contour in comparison with the case where the contour is extracted with respect to the whole captured image without limitation.

BRIEF DESCRIPTION OF THE DRAWINGS

FIG. 11 is an explanatory diagram illustrating discrimination of a pedestrian according to Fourier patterns of the contour.

DETAILED DESCRIPTION OF THE PREFERRED EMBODIMENTS

Figure 1:
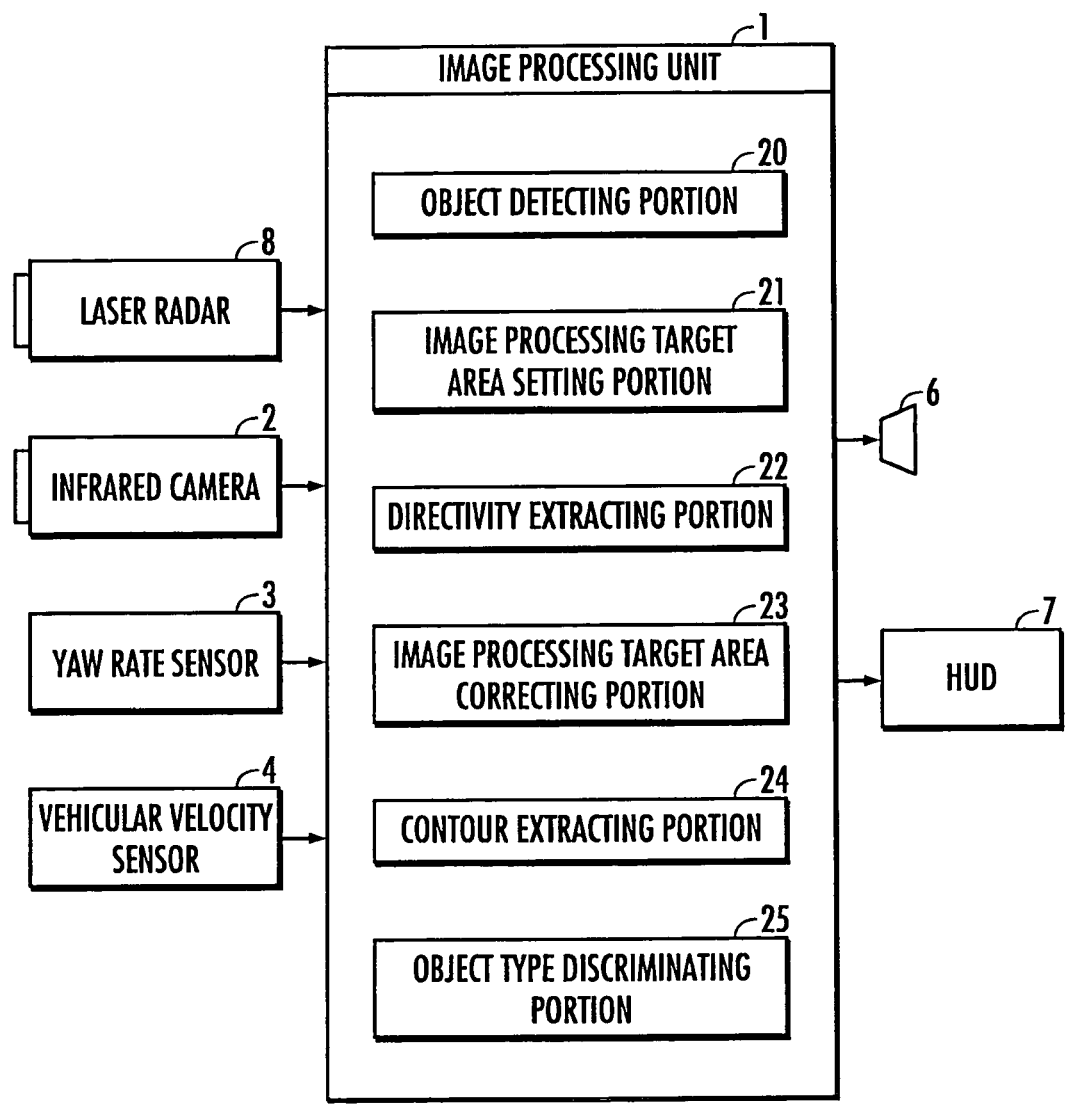
FIG. 1 is a block diagram of a vehicle periphery monitoring device of the present invention.

Hereinafter, an embodiment of the present invention will be described in detail with reference to FIG. 1 to FIG. 11. FIG. 1 is a block diagram of a vehicle periphery monitoring device of the present invention. The vehicle periphery monitoring device of the present invention is provided with an image processing unit 1, an infrared camera 2 capable of detecting far infrared rays (equivalent to an imaging unit of the present invention), a laser radar 8 configured to radiate laser rays on an object and detect a distance between the object and a vehicle (equivalent to a radar of the present invention), a yaw rate sensor 3 configured to detect a yaw rate of the vehicle, and a vehicular velocity sensor 4 configured to detect a driving velocity of the vehicle.

The image processing unit 1 discriminates a type of a monitoring object (a pedestrian, an animal or the like) in front of the vehicle from a captured image by the infrared camera 2, and outputs an alarm when there is a high possibility of contact between the monitoring object and the vehicle. Thereby, the vehicle periphery monitoring device includes a speaker 6 for playing an alarm sound, and a head-up display (hereinafter, referred to as HUD) 7 for displaying visually the monitoring object to a driver.

Figure 2:
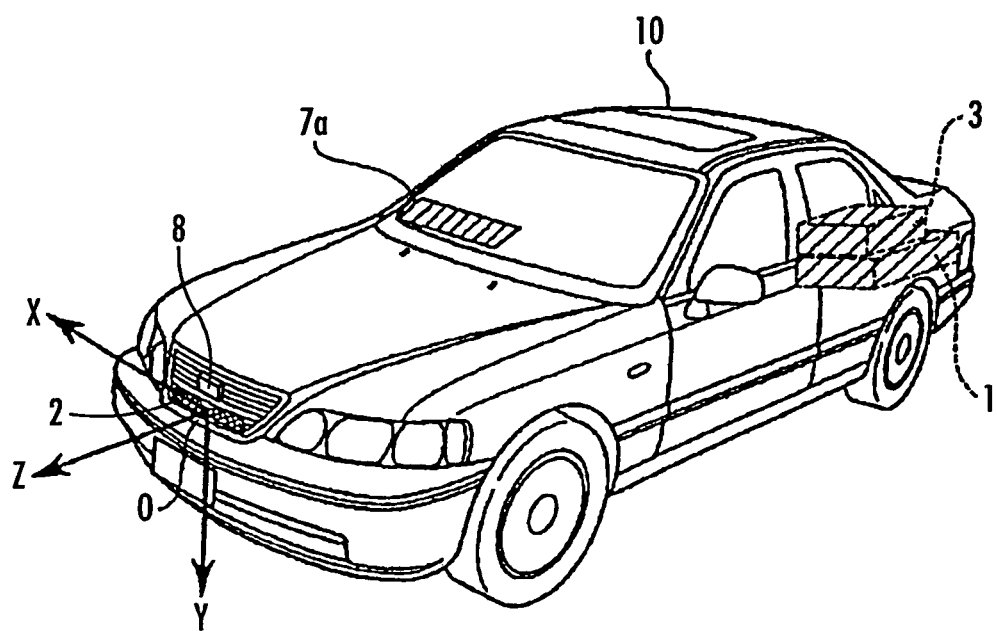
FIG. 2 is an explanatory diagram illustrating an assembled state of the vehicle periphery monitoring device in FIG. 1 to a vehicle.

Hereinafter, with reference to FIG. 2, an assembled state of the vehicle periphery monitoring device to the vehicle will be described. The laser radar 8 is of a two dimensional scanning type and is disposed in a front portion of the vehicle 10. The laser radar scans a first monitoring range preliminarily set in front (moving direction of the vehicle 10) along a horizontal direction and a vertical direction.

The infrared camera 2 has such a property that when a temperature of a captured object becomes higher, an output level thereof will be higher (a luminance thereof will become greater). The infrared camera 2 is disposed in a front portion of the vehicle 10 and images a second monitoring range (defined inside the above-mentioned first monitoring range) preliminarily set in front. The HUD 7 is disposed to display a picture area 7$a$ on a windshield in a front position of the driver's side.

The image processing unit 1 includes an image inputting circuit configured to convert an analogue image signal output from the infrared camera 2 to a digital data and introduce it to an image memory, an interface circuit (corresponding to an accessing portion to access a captured image by the imaging portion of the present invention) configured to access (read and write) the image data introduced to the image memory, and an interface circuit configured to input a distance detection signal from the laser radar 8.

The image processing unit 1 is an electronic unit provided with a computer (an arithmetic processing circuit composed of a CPU, a memory, an input circuit, an output circuit and the like, or a micro computer integrated with these functions) or the like which performs various arithmetic computations on the image data introduced into the image memory.

By causing the computer to execute a vehicle periphery monitoring program of the present invention, the computer functions as an object detecting portion 20 configured to detect an object located in the first monitoring range on the basis of detected distance signals from the laser radar 8, an image processing target area setting portion 21 configured to set an image processing target area which may include an image portion of the monitoring object, a directivity extracting portion 22 configured to perform a directivity extraction processing which extracts directivity (orientation) of each pixel in the image processing target area, an image processing target area correcting portion 23 configured to correct a range of the image processing target area after the directivity extraction processing has been performed thereon, a contour extracting portion 24 configured to extract a contour of the image portion included in the image processing target area, and an object type discriminating portion 25 configured to discriminate a type of the monitoring object in a real space corresponding to the image portion from which the contour has been extracted by the contour extracting portion 24 on the basis of the extracted contour. In the present embodiment, the object type discriminating portion 25 discriminates whether the monitoring object is a pedestrian or not.

Owning to these portions, an object detecting step, an image processing target area setting step, a contour extracting step, and an object type discriminating step in a vehicle periphery monitoring method of the present invention are executed.

A discrimination method for a type of a monitoring object by the image processing unit 1 in an embodiment of the present invention will be described hereinafter with reference to the flow chart illustrated in FIG. 3.

First, the image processing unit 1 performs processing in STEP 1, STEP 20 and STEP 30 in parallel. In STEP 1, the image processing unit 1 retrieves outputs from the vehicular velocity sensor 4 and the yaw rate sensor 3 and calculates a turning angle of the vehicle 10. In STEP 20, the image processing unit 1 is input with a distance measurement data of the first monitoring range from the laser radar 8 and detects an object located in the first monitoring range.

In STEP 30, the image processing unit 1 is input with an infrared image from the infrared camera 2. Note that, in STEP 20, the detection processing for detecting an object located in the first monitoring range is equivalent to the object detecting step of the present invention.

Subsequently in STEP 2, the image processing unit 1 performs docking of the monitoring object located in the first monitoring range while correcting the turning angle on the basis of the distance measurement data from the laser radar 8. The processing in STEP 3 and the processing in STEP 4 are performed by the image processing target area setting portion 20. The image processing target area setting portion 20 estimates an intersection point between the monitoring object and the road surface in STEP 3, and sets the image processing target area by taking the intersection point as a reference in STEP 4. The process of setting the image processing target area in STEP 4 corresponds to the image processing target area setting step of the present invention.

Figure 4:
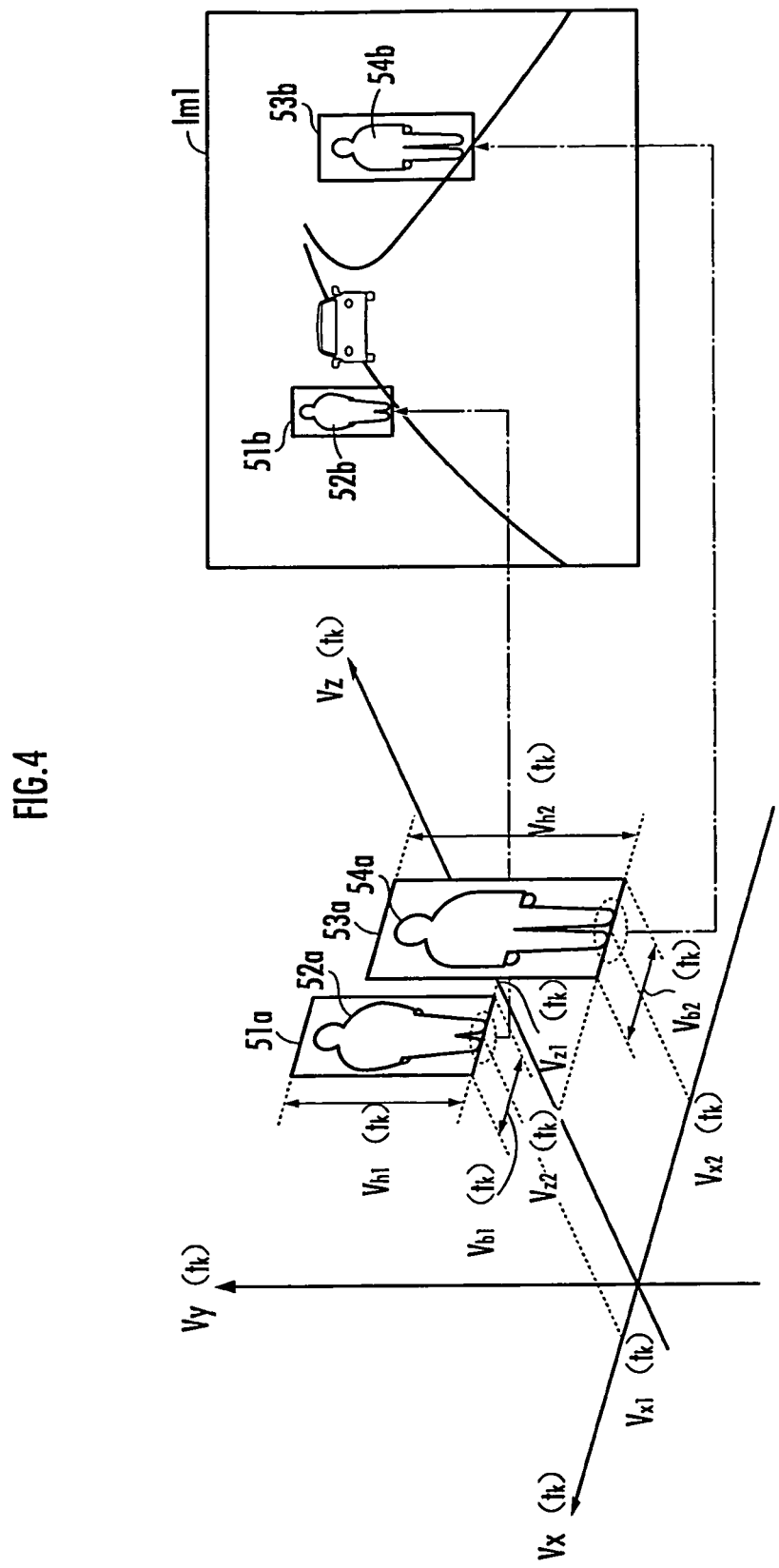
FIG. 4 is an explanatory diagram illustrating a setting processing of an image processing target area on the basis of a distance measurement data of a monitoring object by radar.

FIG. 4 illustrates a method of setting the image processing target area in the infrared image captured by the camera 2 on the basis of the distance measurement data from the laser radar 8 and a physical data of the pedestrian. The left side of FIG. 4 illustrates a situation where the distances to the monitoring objects (pedestrians in the present embodiment) 52a and 54a in front of the vehicle 10 are measured respectively at a timing $t_k$ in a real space having the moving direction of the vehicle 10 as Vz, the vertical direction as Vy and the vehicular width direction as Vx. The right side of FIG. 4 illustrates a captured image Im1 by the infrared camera 2 at the timing $t_k$.

Referring to FIG. 4, the distance $Vz1(t_k)$ between the pedestrian 52a and the vehicle 10, and the distance $Vz2(t_k)$ between the pedestrian 54a and the vehicle 10 are measured. With respect to the pedestrian 52a, the image processing target area setting portion 20 scales the range 51a ($Vb1(t_k) \times Vh1(t_k)$), which is defined according to the physical data of a pedestrian (which is set relatively greater than a general pedestrian and is pre-stored in a memory (not shown) and corresponds to a size data of an object of the present invention) with the intersection point between the pedestrian 52a and the road surface as the reference, down to the image processing target area 51b on the basis of the distance $Vz1(t_k)$ between the pedestrian 52a and the vehicle 10, and sets it on the captured image Im1.

Similarly, with respect to the monitoring object 54a, the image processing target area setting portion 20 scales the range 53a ($Vb2(t_k) \times Vh2(t_k)$), which is defined according to the physical data of a pedestrian with the intersection point between the monitoring object 54a and the road surface as the reference, down to the image processing target area 53b on the basis of the distance $Vz2(t_k)$ between the monitoring object 54a and the vehicle 10, and sets it on the captured image Im1.

Thereby, by setting the image processing target area 51b for the monitoring object 52a and the image processing target area 53b for the monitoring object 54a on the basis of the physical data of the pedestrians with the intersection point to the road surface as the reference, the image processing target area 51b can be set to include the total part of the image portion 52b of the monitoring object 52a and the image processing target area 53b can be set to include the total part of the image portion 54b of the monitoring object 54a.

The subsequent STEP 5 is perpormed by the directivity extracting portion 22. The directivity extracting portion 22 calculates the matrix $J_{pq}(X)$ through a differential filtering expressed by the following mathematical expression (11) for each pixel in the image processing target area.

[Mathematical expression 11]

$$J_{pq}(X) = \int_{-\infty}^{\infty} w(X) \left( \frac{\partial g(X)}{\partial x_p} \frac{\partial g(X)}{\partial x_q} \right) d^2 x \qquad (11)$$

[Mathematical expression 12]

$$\frac{\partial g(X)}{\partial x_p} = \frac{1}{6} \begin{bmatrix} -1 & 0 & 1 \\ -1 & 0 & 1 \\ -1 & 0 & 1 \end{bmatrix} \times [\text{Pixel Data}] \qquad (12)$$

-continued

[Mathematical expression 13]

$$\frac{\partial g(X)}{\partial x_q} = \frac{1}{6}\begin{bmatrix} -1 & -1 & -1 \\ 0 & 0 & 0 \\ 1 & 1 & 1 \end{bmatrix} \times [\text{Pixel Data}] \quad (13)$$

[Mathematical expression 14]

$$J_{pq}(X) = \begin{bmatrix} J_{11} & J_{12} \\ J_{21} & J_{22} \end{bmatrix} \quad (14)$$

$$= W(X) \times \begin{bmatrix} \frac{\partial g(X)}{\partial x_p} \cdot \frac{\partial g(X)}{\partial x_p} & \frac{\partial g(X)}{\partial x_p} \cdot \frac{\partial g(X)}{\partial x_q} \\ \frac{\partial g(X)}{\partial x_p} \cdot \frac{\partial g(X)}{\partial x_q} & \frac{\partial g(X)}{\partial x_q} \cdot \frac{\partial g(X)}{\partial x_q} \end{bmatrix}$$

[Mathematical expression 15]

$$\frac{\partial g(X)}{\partial x_q} \cdot \frac{\partial g(X)}{\partial x_p} = \frac{\partial g(X)}{\partial x_p} \cdot \frac{\partial g(X)}{\partial x_q} \quad (15)$$

Then, the eigenvalue $\lambda$ of the matrix $J_{pq}(X)$ can be calculated out from the mathematical expression (16) according to the following mathematical expressions (17) to (23).

[Mathematical expression 16]

$$J \cdot \vec{v} = \lambda \cdot \vec{v} \quad (16)$$

Herein,
$\vec{v}$: Engenvector, $\lambda$: Engenvalue

[Mathematical expression 17]

$$(J - \lambda I)\vec{v} = 0 \quad (17)$$

[Mathematical expression 18]

$$\det(J - \lambda I) = 0 \quad (18)$$

[Mathematical expression 19]

$$\det\left(\begin{bmatrix} J_{11} & J_{12} \\ J_{12} & J_{22} \end{bmatrix} - \lambda \begin{bmatrix} 1 & 0 \\ 0 & 1 \end{bmatrix}\right) = \det\begin{bmatrix} J_{11} - \lambda & J_{12} \\ J_{12} & J_{22} - \lambda \end{bmatrix} = 0 \quad (19)$$

[Mathematical expression 20]

$$(J_{11} - \lambda)(J_{22} - \lambda) - J_{12}^2 = 0 \quad (20)$$

[Mathematical expression 21]

$$\lambda^2 - (J_{11} + J_{22})\lambda + J_{11}J_{22} - J_{12}^2 = 0 \quad (21)$$

[Mathematical expression 22]

$$\lambda_1 = J'_{11} = \frac{(J_{11} + J_{22}) + \sqrt{(J_{11} - J_{22})^2 + 4J_{12}^2}}{2} \quad (22)$$

[Mathematical expression 23]

$$\lambda_2 = J'_{22} = \frac{(J_{11} + J_{22}) - \sqrt{(J_{11} - J_{22})^2 + 4J_{12}^2}}{2} \quad (23)$$

From the above expressions (22) and (23), the relation according to the following mathematical expression (24) can be obtained.

[Mathematical expression 24]

$$J_{11}' - J_{22}' = \sqrt{(J_{11} - J_{22})^2 + 4J_{12}^2} \quad (24)$$

Figure 5:
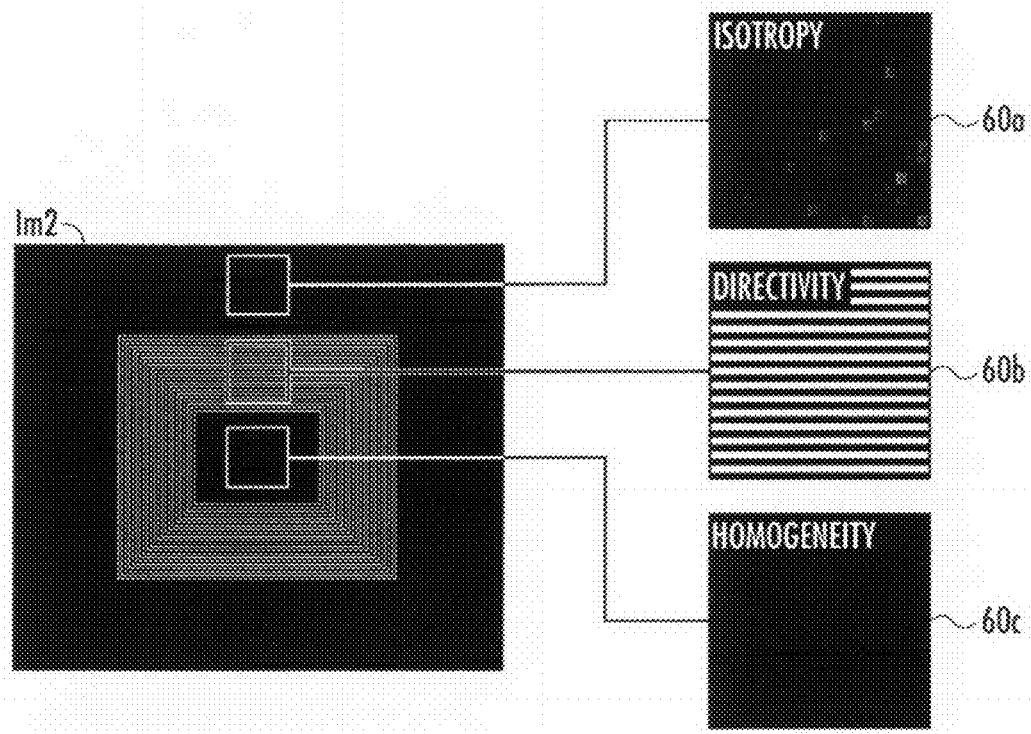
FIG. 5 is an explanatory diagram illustrating behaviors of textured parts in the image portion.

The engenvalues $J_{11}'$ and $J_{22}'$ vary according to textures of the image (patterns according to the luminance variation). In other words, as illustrated in FIG. 5, the engenvalues $J_{11}'$ and $J_{22}'$ vary as follows if the captured image Im2 contains a portion 60a having isotropy (with irregular variation patterns), a portion 60b having directivity (with iterative patterns in a defined direction) and a portion 60c having homogeneity (with no pattern).

(1) Portion having isotropy

[Mathematical expression 25]

$$J'_{11} \cong J'_{22} \neq 0 \quad (25)$$

[Mathematical expression 26]

$$J'_{11} + J'_{22} < C_h \text{ and } \frac{J'_{11} - J'_{22}}{J'_{11} + J'_{22}} > C_i \quad (26)$$

(2) Portion having directivity

[Mathematical expression 27]

$$J'_{11} = 0, \quad J'_{22} > 0 \quad (27)$$

[Mathematical expression 28]

$$J'_{11} + J'_{22} > C_h \text{ and } \frac{J'_{11} - J'_{22}}{J'_{11} + J'_{22}} < C_i \quad (28)$$

(3) Portion having homogeneity

[Mathematical expression 29]

$$J_{11}' = J_{22}' = 0 \quad (29)$$

[Mathematical expression 30]

$$J_{11}' + J_{22}' < C_h \quad (30)$$

Figure 6:
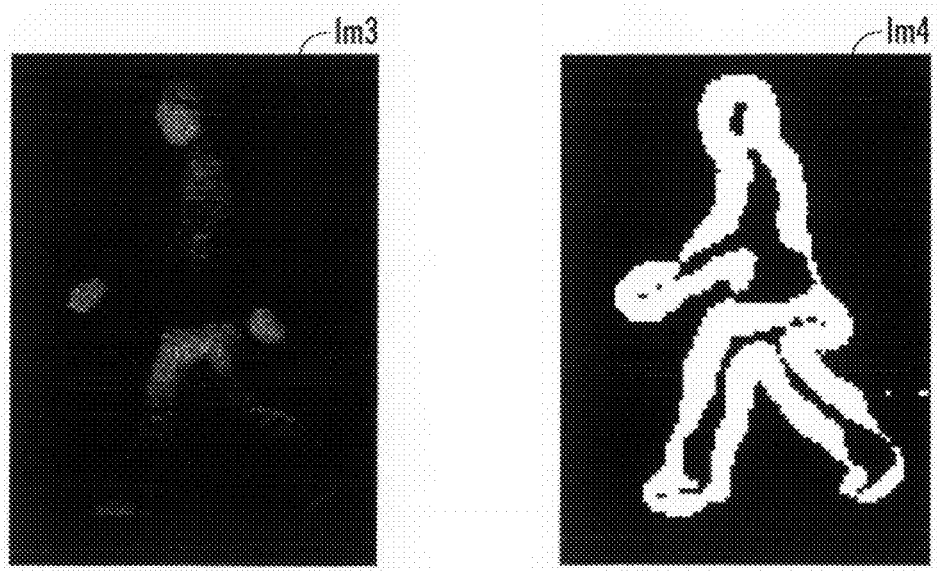
FIG. 6 is an explanatory diagram illustrating orientation images.

Thus, as illustrated in FIG. 6, the directivity extracting portion 22 performs the differential filtering expressed by the mathematical expression (11) above on an image processing target area Im3 set by the image processing target area setting portion 21 and determines whether or not the conditions of the above (1) to (3) hold. The directivity extracting portion 22 performs the directivity extraction processing for generating an orientation image Im4 in which the luminance of pixels in the portion having homogeneity is set at zero (corresponding to a first luminance of the present invention), the luminance of pixels in the portion having directivity is set at a predefined luminance (corresponding to a second luminance of the present invention), and the luminance of pixels in the portion having isotropy is set lower than the luminance of pixels in the portion having directivity. According to the directivity extraction processing, the contour portion of the image portion contained in the image processing target area Im3 is emphasized and the orientation image Im4 can be obtained. Note that a level of the predefined luminance is equivalent to a predefined level of the present invention.

The processing in STEP 6 is performed by the image processing target area correcting portion 23. The image processing target area correcting portion 23 searches a feature region having a feature amount corresponding to a head of the monitoring object, namely a pedestrian, in the image processing target area. If the feature region is detected, the image processing target area correcting portion 23 corrects the position of the image processing target area so as to locate the image portion in the central part of the image processing target area.

The processing in the subsequent STEP 7 and STEP 8 is performed by the contour extracting portion 24. As illustrated by Im5 of FIG. 7, the contour extracting portion 24 sets an initial ellipse 72 on the orientation image 70 which is generated by performing the above-mentioned directivity extraction processing in the image processing target area. In the next STEP 8, the contour extracting portion 24 performs convergence processing on the initial ellipse 72 by converging it toward the center, as illustrated by the enclosed line 73 in Im6.

Figure 7:
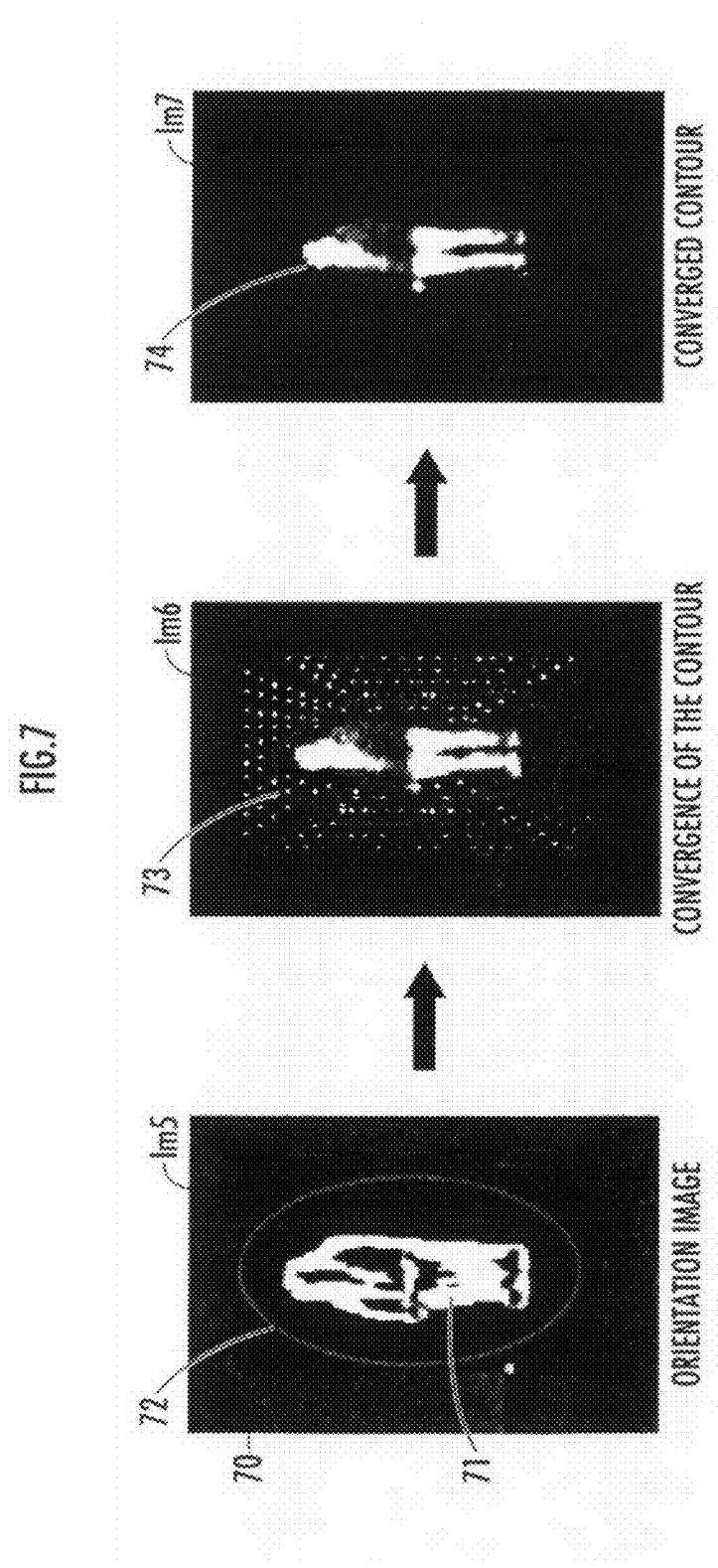
FIG. 7 is an explanatory diagram illustrating a contour extraction processing.
Figure 8:
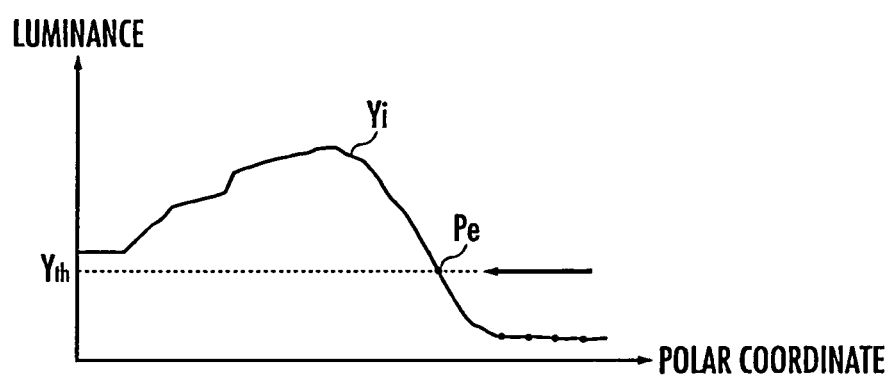
FIG. 8 is an explanatory diagram illustrating a contour extraction processing.
Figure 9:
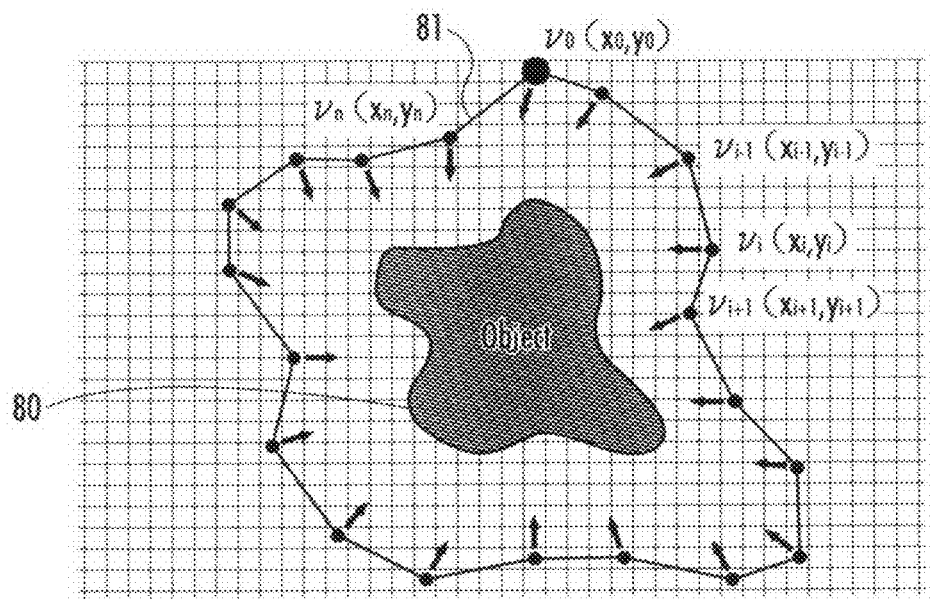
FIG. 9($a$) and FIG. 9($b$) are explanatory diagrams illustrating an internal energy and an external energy according to Snakes algorithm.
Figure 9:
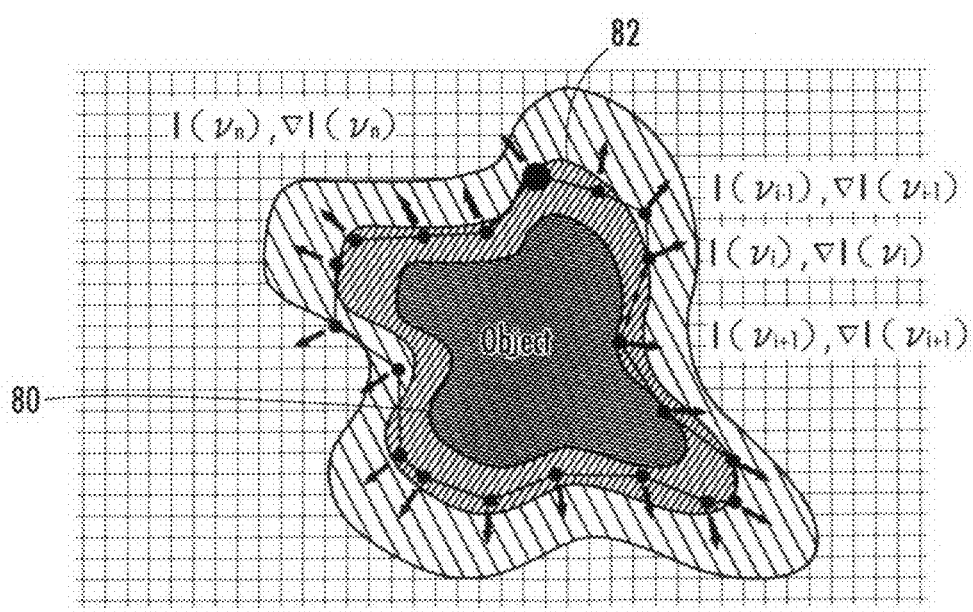

Specifically, as illustrated in FIG. 8, the contour extracting portion 24 causes the initial ellipse 72 to converge by moving each point of the initial ellipse 72 to a position Pe where the luminance is of a threshold value Yth. Accordingly, as illustrated by Im7 of FIG. 7, a contour 74 of the image portion of the monitoring object can be obtained.

Thereafter, the contour extracting portion 24 performs a convergence computation processing according to Snakes algorithm and further makes the contour 74 converge. In general, the Snakes algorithm obtains a contour of a subject by minimizing a sum of an internal energy of the contour (length/shape of the contour) and an external energy thereof (luminance/luminance gradient) according to the mathematical expression (31).

[Mathematical expression 31]

$$E_{snake} = E_{intern} + E_{extern} \cong \min \tag{31}$$

Herein, $E_{intern}$: Internal energy of the contour; $E_{extern}$: External energy of the contour.

As illustrated in FIG. 9(a), the internal energy of the contour is a force drawing the contour 81 inward (toward the object 80 of which the contour is to be extracted) and is expressed by the mathematical expression (32).

[Mathematical expression 32]

$$E_{intern} = \frac{1}{2}\sum_i \alpha_i \left[\left(\frac{x_i -}{x_{i-1}}\right)^2 + \left(\frac{y_i -}{y_{i-1}}\right)^2\right] + \frac{1}{2}\sum_i \beta_i \left[\left(\frac{2x_i -}{x_{i-1} -}{x_{i+1}}\right)^2 + \left(\frac{2y_i -}{y_{i-1} -}{y_{i+1}}\right)^2\right] \tag{32}$$

As illustrated in FIG. 9(b), the external energy of the contour is a force pushing the contour 82 outward (leaving away from the object 80 of which the contour is to be extracted) and is expressed by the mathematical expression (33).

[Mathematical expression 33]

$$E_{extern} = \sum_i -\omega_1 I(v_i) + \sum_i -\omega_2 |\nabla I(v_i)|^2 \tag{33}$$

Herein, $I(v_i)$: Luminance; $\nabla I(v_i)$: Luminance gradient

If a continuous model of contour is defined according to the following mathematical expression (34), then the Snakes expression (31) can be expressed by the following mathematical expression (35).

[Mathematical expression 34]

$$K(q) = (x(q), y(q))^T, q \in [0, 1] \tag{34}$$

[Mathematical expression 35]

$$E(K(q)) = \int_0^1 (E_{int}(K(q)) + E_{ext}(K(q))) dq \tag{35}$$

If using the following mathematical expressions (36) and (37) to express the Snakes expression, it can be expressed by the following mathematical expression (38).

[Mathematical expression 36]

$$E_{int}(K(q)) = \frac{\alpha}{2}\left|\frac{\partial K(q)^2}{\partial q}\right| + \frac{\beta}{2}\left|\frac{\partial^2 K(q)}{\partial q^2}\right|^2 \tag{36}$$

[Mathematical expression 37]

$$E_{ext}(K(q)) = -|\nabla G(K(q))|^2 = -|\nabla G(x(q), y(q))^T|^2 \tag{37}$$

[Mathematical expression 38]

$$E = \int_0^1 \frac{\alpha}{2}\left[\left(\frac{\partial x(q)}{\partial q}\right)^2 + \left(\frac{\partial y(q)}{\partial q}\right)^2\right] + \frac{\beta}{2}\left[\left(\frac{\partial^2 x(q)}{\partial q^2}\right)^2 + \left(\frac{\partial^2 y(q)}{\partial q^2}\right)^2\right] - |\nabla G(x(q), y(q))^T|^2 dq \tag{38}$$

The following mathematical expressions (40) and (41) can be deduced by using Euler-Lagrange theorem on the following mathematical expression (39).

[Mathematical expression 39]

$$\frac{\partial F}{\partial f} - \frac{d}{dx}\frac{\partial F}{\partial f'} + \frac{d^2}{dx^2}\frac{\partial F}{\partial f''} - \ldots + (-1)^n \frac{d^n}{dx^n}\frac{\partial F}{\partial f^n} = 0 \tag{39}$$

[Mathematical expression 40]

$$-\frac{\partial}{\partial x}|\nabla G(x(q), y(q))^T|^2 - \alpha \frac{\partial^2 x(q)}{\partial q^2} + \beta \frac{\partial^4 x(q)}{\partial q^4} = 0 \tag{40}$$

[Mathematical expression 41]

$$-\frac{\partial}{\partial y}|\nabla G(x(q), y(q))^T|^2 - \alpha \frac{\partial^2 y(q)}{\partial (q^2)} + \beta \frac{\partial^4 y(q)}{\partial q^4} = 0 \tag{41}$$

A discrete model of contour is defined by the following mathematical expression (42), and it can be expressed by the following mathematical expression (43) if the finite difference method is used by setting E=0.

[Mathematical expression 42]

$$K_i = (x_i, y_i)^T = (x(ih), y(ih))^T, i \in \{0, 1, \ldots, n-1\} \tag{42}$$

[Mathematical expression 43]

$$-\frac{\alpha}{h^2}(K_{i-1} - 2K_i + K_{i+1}) + \frac{\beta}{h^4}(K_{i-2} - 4K_{i-1} + 6K_{i+1} - 4K_{i+1} + K_{i+2}) + \left(\frac{\partial E_{ext}(K_i)}{\partial x_i}, \frac{\partial E_{ext}(K_i)}{\partial y_i}\right)^T = 0 \tag{43}$$

[Mathematical expression 44]

$$Ax + fx(x, y) = 0 \tag{44}$$

[Mathematical expression 45]

$$Ay + fy(x, y) = 0 \tag{45}$$

[Mathematical expression 46]

$$x = \{x_0, x_1, \ldots, x_{n-1}\}^T \tag{46}$$

-continued

[Mathematical expression 47]

$$y = \{y_0, y_1, \ldots, y_{n-1}\}^T \quad (47)$$

[Mathematical expression 48]

$$fx(x, y) = \left(\frac{\partial E_{ext}(K_0)}{\partial x_0}, \frac{\partial E_{ext}(K_1)}{\partial x_1}, \ldots, \frac{\partial E_{ext}(K_{n-1})}{\partial x_{n-1}}\right) \quad (48)$$

[Mathematical expression 49]

$$fy(x, y) = \left(\frac{\partial E_{ext}(K_0)}{\partial y_0}, \frac{\partial E_{ext}(K_1)}{\partial y_1}, \ldots, \frac{\partial E_{ext}(K_{n-1})}{\partial y_{n-1}}\right) \quad (49)$$

[Mathematical expression 50]

$$A = \begin{bmatrix} c & d & e & 0 & \ldots & 0 & a & b \\ b & c & d & e & 0 & \ldots & 0 & a \\ a & b & c & d & e & 0 & \ldots & 0 \\ 0 & a & b & c & d & e & \ddots & \vdots \\ \vdots & \ddots & \ddots & \ddots & \ddots & \ddots & \ddots & 0 \\ 0 & \ldots & 0 & a & b & c & d & e \\ e & 0 & \ldots & 0 & a & b & c & d \\ d & e & 0 & \ldots & 0 & a & b & c \end{bmatrix} \quad (50)$$

[Mathematical expression 51]

$$a = \frac{\beta}{h^4} = e \quad (51)$$

[Mathematical expression 52]

$$b = -\frac{\alpha}{h^2} - 4\frac{\beta}{h^4} = d \quad (52)$$

[Mathematical expression 53]

$$c = 2\frac{\alpha}{h^2} + 6\frac{\beta}{h^4} \quad (53)$$

When the initial ellipse has been converged to the contour of the object, if the iteration step (step size when moving the contour inward) is set to $\gamma$, then the Snakes energy (=the internal energy+the external energy), the positional variation of the contour and the variation of the external energy become zero. Therefore, the relations according to the following mathematical expressions (54) to (56) hold.

[Mathematical expression 54]

$$A\vec{K} + \vec{F}(\vec{K}) = 0 \quad (54)$$

[Mathematical expression 55]

$$-\frac{\vec{K}^t - \vec{K}^{t-1}}{\gamma} = 0 \quad (55)$$

[Mathematical expression 56]

$$\vec{F}^t \cong \vec{F}^{t-1} \quad (56)$$

From the above mathematical expressions (54) to (56), the relationship expressed by the following mathematical expression (57) can be obtained.

[Mathematical expression 57]

$$A\vec{K}^t + \vec{F}^t(\vec{K}) = A\vec{K}^{t-1} + \vec{F}^{t-1}(\vec{K}) = -\frac{\vec{K}^t - \vec{K}^{t-1}}{\gamma} \quad (57)$$

If the above mathematical expression is expressed in explicit formula, it has the forms represented by the following mathematical expressions (58) to (60), therefore, it is necessary to do multiplication computations for $2n^2$ times and addition computations for $2n(n-1)$ times by a total of x and y in the convergence computation of the contour.

[Mathematical expression 58]

$$\vec{K}^t = (I + \gamma A)^{-1}(\vec{K}^{t-1} - \gamma \vec{K}^{t-1}) \quad (58)$$

[Mathematical expression 59]

$$x^t = (I + \gamma A)^{-1}(x^{t-1} - \gamma f_x(x^{t-1}, y^{t-1})) \quad (59)$$

[Mathematical expression 60]

$$y^t = (I + \gamma A)^{-1}(y^{t-1} - \gamma f_y(x^{t-1}, y^{t-1})) \quad (60)$$

Thereby, the contour extracting portion reduces the throughput of the contour convergence processing so as to shorten the time needed to extract the contour according to the algorithm (hereinafter, referred to as high speed Snakes) to be described below.

If the Snakes energy, the positional variation of the contour, the external energy variation and the internal energy variation at the convergence of contour in the Snakes model is set at zero, respectively, then the following mathematical expressions (61) to (64) hold.

[Mathematical expression 61]

$$A\vec{K} + \vec{F}(\vec{K}) = 0 \quad (61)$$

[Mathematical expression 62]

$$-\frac{\vec{K}^t - \vec{K}^{t-1}}{\gamma} = 0 \quad (62)$$

[Mathematical expression 63]

$$\vec{F}^t \cong \vec{F}^{t-1} \quad (63)$$

[Mathematical expression 64]

$$A\vec{K}^t = A\vec{K}^{t-1} \quad (64)$$

Accordingly, the following mathematical expression (65) is obtained. If the mathematical expression (65) is expressed in explicit formula, the following mathematical expressions (66) to (68) can be obtained.

[Mathematical expression 65]

$$A\vec{K}^t + \vec{F}^t(\vec{K}) = A\vec{K}^{t-1} + \vec{F}^{t-1}(\vec{K}) = -\frac{\vec{K}^t - \vec{K}^{t-1}}{\gamma} \quad (65)$$

[Mathematical expression 66]

$$\vec{K}^t = (I - \gamma A)\vec{K}^{t-1} - \gamma \vec{F}^{t-1} \quad (66)$$

[Mathematical expression 67]

$$x^t = (I - \gamma A)x^{t-1} - \gamma f_x(x^{t-1}, y^{t-1}) \quad (67)$$

[Mathematical expression 68]

$$y^t = (I - \gamma A)y^{t-1} - \gamma f_y(x^{t-1}, y^{t-1}) \quad (68)$$

If the above-mentioned mathematical expressions (67) and (68) are transformed into a form in which (I−γA) multiplies the external energy, they can be expressed by the mathematical expressions (69) and (70), respectively.

[Mathematical expression 69]

$$x^t = (I-\gamma A)\{x^{t-1} - \gamma f_x(x^{t-1}, y^{t-1})\} \tag{69}$$

[Mathematical expression 70]

$$y^t = (I-\gamma A)\{y^{t-1} - \gamma f_x(x^{t-1}, y^{t-1})\} \tag{70}$$

Thereby, the mathematical expressions (69) and (70) can be expressed in the following mathematical expressions (71) to (75), the contour can be converged by multiplication computations for 6n times and addition computations for 8n times by the total of x and y.

[Mathematical expression 71]

$$x_i^t = c'x_i' + b'(x_{i-1}' + x_{i+1}') + a'(x_{i-2}' + x_{i+2}') \tag{71}$$

[Mathematical expression 72]

$$y_i^t = c'y_i' + b'(y_{i-1}' + y_{i+1}') + a'(y_{i-2}' + y_{i+2}') \tag{72}$$

[Mathematical expression 73]

$$i \in \{0, 1, \ldots, n-1\}, n \geq 4, x_{n\pm 1} = x_{\pm 1}, y_{n\pm 1} = y_{\pm 1} \tag{73}$$

[Mathematical expression 74]

$$x' = x^{t-1} - \gamma f_x(x^{t-1}, y^{t-1}) \tag{74}$$

[Mathematical expression 75]

$$y' = y^{t-1} - \gamma f_y(x^{t-1}, y^{t-1}) \tag{75}$$

[Mathematical expression 76]

$$a' = -\gamma \frac{\beta}{h^4} \tag{76}$$

[Mathematical expression 77]

$$b' = \gamma\left(\frac{\alpha}{h^2} + 4\frac{\beta}{h^4}\right) \tag{77}$$

[Mathematical expression 78]

$$c' = 1 - \gamma\left(2\frac{\alpha}{h^2} + 6\frac{\beta}{h^4}\right) \tag{78}$$

Therefore, by using the high speed Snakes, it is possible to reduce the throughput from (multiplication computations for $2n^2$ times and addition computations for $2n(n-1)$ times) when the common Snakes algorithm is used to (multiplication computation for 6n times and addition computations for 8n times). Thereby, even for a vehicular computer with a low performance, it is possible to discriminate the type of the monitoring object by using the contour extraction processing. However, in order to make the contour converge steadily, it is necessary for (I−γA) to be a smoothing filter. Thus, as illustrated by the following mathematical expression (79), the filter gain F(s) should not be greater than 1.

[Mathematical expression 79]

$$\text{Max}|\hat{F}(\tilde{S})| \leq 1 \tag{79}$$

Herein, $\hat{F}(\tilde{S})$: Expression denoting the filter gain in a frequency band region.

Since the above-mentioned matrix A is expressed by the differential filters of second order and fourth order according to the mathematical expressions (43) and (44), the smoothing term (I−γA) can be denoted by (I−κD$^p$) (D: derivative filter, p represents an order), thereby, the condition where (I−κD$^p$) becomes the smoothing filter is defined by the mathematical expression (80).

[Mathematical expression 80]

$$\text{Max}|I-\kappa D^p| \leq 1 \tag{80}$$

Here, the differential filter [1, −1] becomes 2i sin(π$\tilde{S}$/2) if represented by the frequency region, and D$^p$ is expressed by the following mathematical expression (81). Therefore, the condition defined by the following mathematical expression (82) must be satisfied.

[Mathematical expression 81]

$$D^p = [2i \sin(\pi \tilde{S}/2)]^p \tag{81}$$

[Mathematical expression 82]

$$\text{Max}|1-\kappa|(2i)_p \sin^p(\pi \tilde{S}/2)| \leq 1 \tag{82}$$

In the mathematical expression (82) above, the left side thereof becomes maximum as $\tilde{S}=1$, then, the above mathematical expression (82) can be transformed into the following mathematical expression (83).

[Mathematical expression 83]

$$\text{Max}|1-\kappa|(2i)^p| \leq 1 \tag{83}$$

Take squire both sides of the mathematical expression (83), and resolve k on a condition that p is an even number since the matrix A is expressed by the differential filter of the second and fourth order, then the following mathematical expressions (84) to (86) hold.

[Mathematical expression 84]

$$1 - 2k|(2i)^p| + k^2|(2i)^p|^2 \leq 1 \text{ for } p = 2, 4, 6, \tag{84}$$

[Mathematical expression 85]

$$k \leq \frac{2}{|(2i)^p|} \tag{85}$$

[Mathematical expression 86]

$$k \leq \frac{1}{2^{p-1}} \tag{86}$$

The actual (I−γA) can be denoted as the following mathematical expression (87) from the above-mentioned mathematical expressions (43) and (44). Accordingly, the mathematical expressions (84) to (86) hold the forms denoted by the following mathematical expressions (87) to (91).

[Mathematical expression 87]

$$\left|1 + \frac{\gamma\alpha}{h^2}|(2i)^2| - \frac{\gamma\beta}{h^4}|(2i)^4|\right| \leq 1 \tag{87}$$

[Mathematical expression 88]

$$k' = \frac{\gamma\alpha}{h^2} + 4\frac{\gamma\beta}{h^4} \tag{88}$$

-continued

[Mathematical expression 89]

$$|1 - 4k'| \leq 1 \quad (89)$$

[Mathematical expression 90]

$$1 - 8k' + 16k'^2 \leq 1 \quad (90)$$

[Mathematical expression 91]

$$k' \leq \frac{1}{2} \quad (91)$$

[Mathematical expression 92]

$$\frac{\alpha}{h^2} + 4\frac{\beta}{h^4} \leq \frac{1}{2\gamma} \quad (92)$$

Thus, by setting the iteration step γ satisfying the condition defined by the mathematical expression (92) above, it is possible to make the contour converge steadily. Note that the contour extraction processing for extracting the contour of the image portion of the monitoring object in STEP 7 and STEP 8 is equivalent to the contour extracting step of the present invention.

Figure 3:
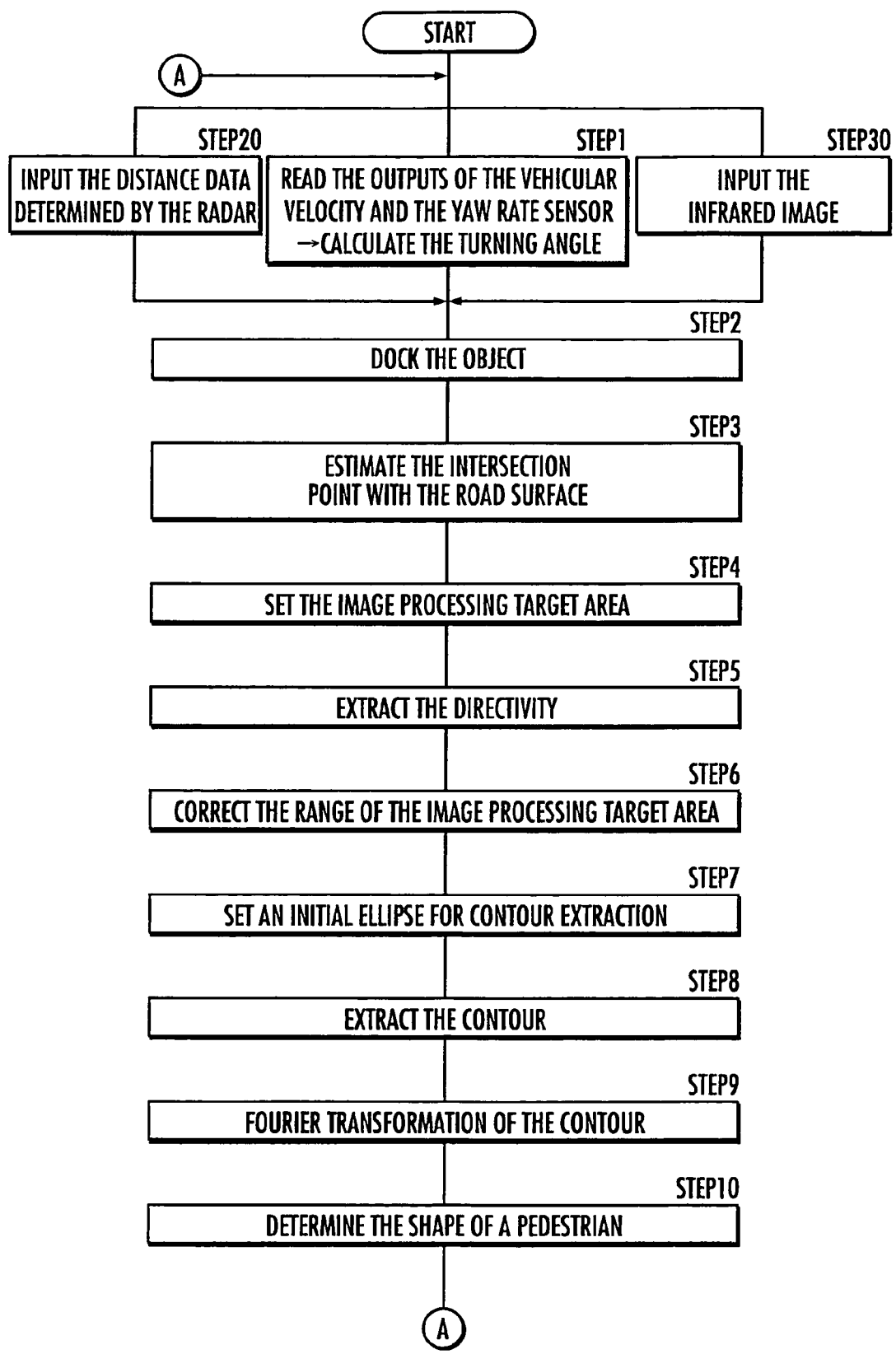
FIG. 3 is a flow chart illustrating a pedestrian discriminating process of the present invention.
Figure 10:
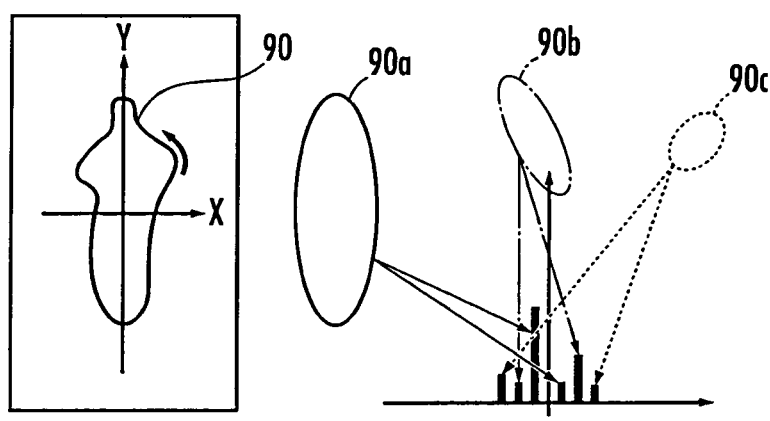
FIG. 10 is an explanatory diagram illustrating Fourier transformation on the contour data.

Subsequent STEP 9 and STEP 10 in FIG. 3 are performed by the object type discriminating portion 25. In STEP 9, the object discriminating portion 25, as illustrated in FIG. 10, performs Fourier transformation on the data of the contour 90 extracted from the image portion of the monitoring object, and calculates the Fourier pattern of the contour 90 according to the following mathematical expressions (93) to (95). The graph on the right side of FIG. 10 illustrates a Fourier pattern where the frequency is set as the lateral axis and the percentage of frequency is set as the vertical axis.

[Mathematical expression 93]

$$K: z_n = x_n + iy_n \quad (93)$$

Herein, $K$: data of the contour

[Mathematical expression 94]

$$z_n = \frac{1}{\sqrt{N}} \sum_{k=0}^{N-1} \hat{z}_k e^{i2\pi k \frac{n}{N}} \quad (94)$$

[Mathematical expression 95]

$$\hat{z}_k = \frac{1}{\sqrt{N}} \sum_{n=0}^{N-1} z_n e^{-i2\pi k \frac{n}{N}} \quad (95)$$

Then, as illustrated in FIG. 11, the object type discriminating portion 25 calculates a difference $D_{min}$ between the Fourier pattern 100a of the contour 100 of the monitoring object calculated accordingly and each of reference patterns 110a, 111a . . . of contours of pedestrians, namely the preset type of the monitoring object, according to the following mathematical expression (96).

[Mathematical expression 96]

$$D_{min} = \sum_{k=1}^{\frac{N}{2}} [z(k) + z(-k) - z_{ref}(k) - z_{ref}(-k)]^2 \quad (96)$$

Herein, $z(k)$, $z(k-1)$: Data of the Fourier pattern of the contour of the image portion of the monitoring object; $z_{ref}(k)$, $z_{ref}(k-1)$: Data of the reference pattern.

The reference patterns 110a, 111a . . . are Fourier patterns calculated on the basis of the contours of the posture patterns 110, 111 . . . of the pedestrians, respectively. The object type discriminating portion 25 determines that the monitoring object is a pedestrian when the $D_{min}$ calculated according to the above mathematical expression (96) is equal to or smaller than a predefined threshold.

The process of discriminating the type of the monitoring object in STEP 9 and STEP 10 is equivalent to the object type discriminating step of the present invention.

The present invention is described to discriminate whether a monitoring object is a pedestrian or not in the present embodiment, it can be also used to discriminate whether a monitoring object is a large-sized animal, a vehicle or the like. In this case, the reference Fourier pattern is set in accordance with the type of the monitoring object to be discriminated.

In the present embodiment, the object type discriminating portion 25 discriminates the type of the monitoring object according to the Fourier pattern of the contour; it is acceptable to discriminate the type of the monitoring object according to the other methods, such as pattern matching of contour shapes and extraction of a feature amount.

In the present embodiment, the object detecting portion 20 detects an object on the basis of the distance measurement data by the laser radar, the image processing target area setting portion 21 sets the image processing target area on the basis of the detection result by the object detecting portion 20; it is also acceptable to configure the object detecting portion 20 as to detect an object according to an infrared image by the infrared camera 2. In this case, the object detecting portion 20, for example, detects the object on the basis of a binary image portion extracted according to a binary processing performed on the infrared image, and the image processing target area setting portion 21 sets the image processing target area according to the position of the detected object. If a visible camera is used, it is acceptable that the object detecting portion 20 detects an object on the basis of distance data of each of pixels in the image detected by, for example, a stereo camera, specifically, if pixels have almost equal distances, then those pixels belong to the object; and then the image processing target area setting portion 21 sets the image processing target area according to the position of the detected object.

In the present embodiment, the orientation image is generated according to the directivity extraction processing performed by the directivity extracting portion 22 in STEP 5 of FIG. 3. However, the present invention is adaptable even without the directivity extraction processing being performed.

In the present embodiment, the contour extracting portion 24 extracts the contour of the image portion of the monitoring object by performing the convergence processing of the contour according to the luminance difference of the orientation image illustrated in FIG. 7 in STEP 8 of FIG. 3 and then the convergence processing of the contour according to the high speed Snakes algorithm. However, it is acceptable to fulfill the present invention by performing the convergence processing of the contour according to the luminance difference of the orientation image only, or performing the convergence processing of the contour according to the high speed Snakes algorithm only.

In the present embodiment, the infrared camera 2 is used as the imaging unit of the present invention. However, it is acceptable to use a common camera capable of detecting visible lights only.

In the present embodiment, the present invention is configured to image the front side of the vehicle. However, it is acceptable to image another direction, such as the rear side, the lateral side or the like, and judge the contact probability to the monitoring object.

INDUSTRIAL APPLICABILITY

As above-mentioned, the present invention is capable of reducing a throughput of extracting a contour of an image portion of a monitoring object contained in a captured image and shortening a time required for extracting the contour, therefore, it is usable in monitoring the periphery of a vehicle.

What is claimed is:

1. A vehicle periphery monitoring device which is provided with an imaging unit mounted in a vehicle to image a periphery of the vehicle and is configured to monitor the periphery of the vehicle on the basis of a captured image by the imaging unit, comprising:
    an object detecting portion configured to detect a distance from the vehicle of an object located in an imaging area imaged by the imaging unit;
    an image processing target area setting portion configured to set an image processing target area which may include an image portion of a monitoring object in the captured image on the basis of the detected distance of the object from the vehicle by the object detecting portion;
    a contour extracting portion configured to extract a contour of the image portion included in the image processing target area; and
    an object type discriminating portion configured to discriminate a type of the monitoring object in a real space corresponding to the image portion from which the contour has been extracted by the contour extracting portion on the basis of the extracted contour, wherein
    the contour extracting portion extracts the contour of the image portion by setting an initial eclipse circling the image portion in the image processing target area and performing a contour convergence processing on the initial ellipse according to Snakes algorithm,
    the contour convergence processing is performed according to the Snakes algorithm by using a computation expression in which a multiplication term of an internal energy of Snakes energy where the Snakes energy and a contour positional variation and an external energy variation and an internal energy variation are presumed to be of zero at the time when a contour of a Snakes model of a discrete system is converged is multiplied to a multiplication term of the external energy, and wherein
    the contour extracting portion uses the following mathematical expressions (1) and (2) as the computation expression:

[Mathematical expression 1]

$$x^t = (I-gA)\{x^{t-1} - gf_x(x^{t-1}, y^{t-1})\} \quad (1)$$

[Mathematical expression 2]

$$y^t = (I-gA)\{y^{t-1} - gf_y(x^{t-1}, y^{t-1})\} \quad (2)$$

Herein,
    $(x^t, y^t)$: coordinate of a contour dot at timing t;
    $(x^{t-1}, y^{t-1})$: a model expression of the contour at timing t−1;
    I: a unit matrix;
    A: a transform matrix of internal energy:
    γ: an iteration step (moving amount of the contour per step when converged inward);
    $f_x$: a computation expression of x components of the external energy; and
    $f_y$: a computation expression of y components of the external energy.

2. The vehicle periphery monitoring device according to claim 1, wherein
    the object type discriminating portion discriminates whether or not the type of the monitoring object in the real space corresponding to the image portion from which the contour has been extracted is a predefined type by comparing a frequency component of the contour extracted by the contour extracting portion with a comparison pattern of frequency components set according to the monitoring object of the predefined type.

3. The vehicle periphery monitoring device according to claim 1, further includes a directivity extracting portion configured to perform a directivity extraction processing which performs a differential filtering on each of pixels in the image processing target area in a predefined direction, allocates a predefined first luminance to a pixel whose directivity has been recognized by the differential filtering, and allocates a second luminance having a difference of not smaller than a predefined level compared with the first luminance to a pixel whose directivity is not recognized,
    wherein the contour extracting portion extracts the contour of the image portion in the image processing target area where the directivity extraction processing has been performed.

4. The vehicle periphery monitoring device according to claim 3, wherein the contour extracting portion extracts the contour of the image portion by setting an initial eclipse circling the image portion in the image processing target area where the directivity extraction processing has been performed and scaling down the circumference of the initial ellipse inward to a position of a pixel which has a luminance equal to a threshold set between the first luminance and the second luminance.

5. The vehicle periphery monitoring device according to claim 3, wherein
    the contour extracting portion sets an initial eclipse circling the image portion in the image processing target area where the directivity extraction processing has been performed, and extracts a contour of the image portion by scaling down the circumference of the initial ellipse inward to a position of a pixel which has a luminance equal to a threshold set between the first luminance and the second luminance;
    the extracted contour is further converged by a contour convergence processing performed thereon according to Snakes algorithm; and
    the contour convergence processing is performed according to the Snakes algorithm by using a computation expression in which a multiplication term of an internal energy of Snakes energy where the Snakes energy and a contour positional variation and an external energy variation and an internal energy variation are presumed to be of zero at the time when a contour of a Snakes model of a discrete system is converged is multiplied to a multiplication term of the external energy.

6. The vehicle periphery monitoring device according to claim 1, wherein
    the iteration step γ in the mathematical expressions (1) and (2) is configured to satisfy the following conditions defined by the mathematical expression (5) for the following mathematical expression (4) which is a Snakes expression where the discrete model of the contour is defined according to the following mathematical expression (3):

[Mathematical expression 3]

$$K_i = (x_i, y_i)^T = (x(ih), (ih))^T, i \hat{I}\{0, 1, L, n-1\} \quad (3)$$

Herein, Ki: discrete model of the contour

[Mathematical expression 4]

$$\begin{aligned}E &= \sum_{i=0}^{n-1}(E_{int}(K_i) + E_{ext}(K_i)) \\ &= -\frac{\alpha}{h^2}(K_{i-1} - 2K_i + K_{i+1}) + \\ &\quad \frac{\beta}{h^4}(K_{i-2} - 4K_{i-1} + 6K_{i+1} - 4K_{i+1} + K_{i+2}) + \\ &\quad \left(\frac{\partial E_{ext}(K_i)}{\partial x_i}, \frac{\partial E_{ext}(K_i)}{\partial y_i}\right)^T\end{aligned} \quad (4)$$

Herein,
E: Snakes expression;
$E_{int}(K_i)$: Internal energy:
$E_{ext}(K_i)$: External energy:
α, β: computation coefficients:

[Mathematical expression 5]

$$\frac{\alpha}{h^2} + 4\frac{\beta}{h^4} \le \frac{1}{2\gamma}. \quad (5)$$

7. The vehicle periphery monitoring device according to claim 1, further includes a radar configured to detect a distance between the vehicle and the object located in the imaging area imaged by the imaging unit,
wherein the object detecting portion detects the object located in the imaging area according to the distance detected by the radar.

8. A vehicle periphery monitoring method which monitors a periphery of a vehicle according to a computer provided with an accessing portion configured to access a captured image by an imaging unit which is mounted in the vehicle to image the periphery of the vehicle to monitor the periphery of the vehicle on the basis of the captured image by the imaging unit, comprising steps of:

an object detecting step in which the computer detects a distance from the vehicle of an object located in an imaging area imaged by the imaging unit;

an image processing target area setting step in which the computer sets an image processing target area which may include an image portion of a monitoring object in the captured image on the basis of the detected distance of the object from the vehicle by the object detecting step;

a contour extracting step in which the computer extracts a contour of the image portion included in the image processing target area; and an object type discriminating step in which the computer discriminates a type of the monitoring object in a real space corresponding to the image portion from which the contour has been extracted by the contour extracting step on the basis of the extracted contour, wherein the contour extracting portion extracts the contour of the image portion by setting an initial eclipse circling the image portion in the image processing target area and performing a contour convergence processing on the initial ellipse according to Snakes algorithm, the contour convergence processing is performed according to the Snakes algorithm by using a computation expression in which a multiplication term of an internal energy of Snakes energy where the Snakes energy and a contour positional variation and an external energy variation and an internal energy variation are presumed to be of zero at the time when a contour of a Snakes model of a discrete system is converged is multiplied to a multiplication term of the external energy, and wherein the contour extracting portion uses the following mathematical expressions (1) and (2) as the computation expression:

[Mathematical expression 1]

$$x^t = (I - gA)\{x^{t-1} - gf_x(x^{t-1}, y^{t-1})\} \quad (1)$$

[Mathematical expression 2]

$$y^t = (I - gA)\{y^{t-1} - gf_y(x^{t-1}, y^{t-1})\} \quad (2)$$

Herein
$(x^t, y^t)$: coordinate of a contour dot at timing t;
$(x^{t-1}, y^{t-1})$: a model expression of the contour at timing t−1;
I: a unit matrix;
A: a transform matrix of internal energy:
γ: an iteration step (moving amount of the contour per step when converged inward);
$f_x$: a computation expression of x components of the external energy; and
$f_y$: a computation expression of y components of the external energy.

* * * * *